Jan. 5, 1937.  J. I. WILCOXEN, SR., ET AL  2,066,812
AGRICULTURAL IMPLEMENT
Filed July 9, 1936  2 Sheets-Sheet 2
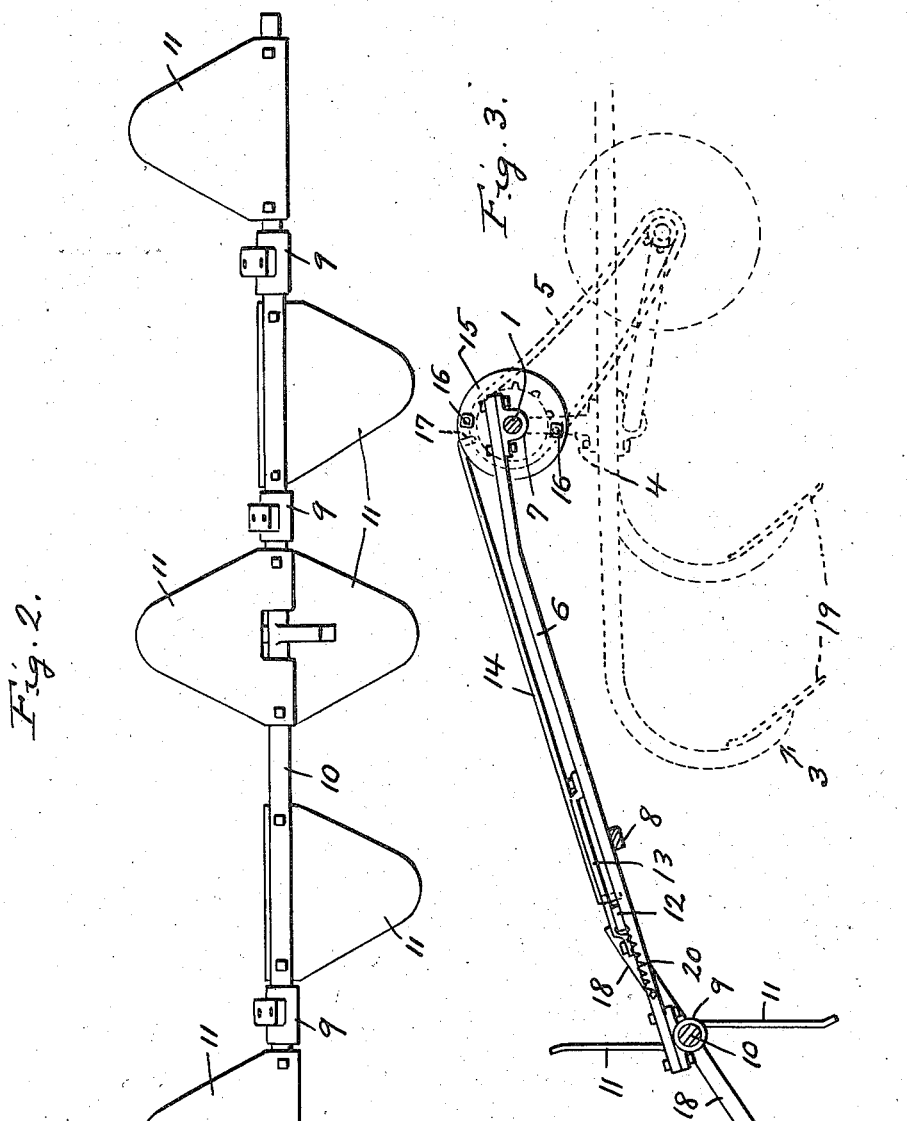
Inventors
J. I. Wilcoxen, Sr.
J. I. Wilcoxen, Jr.
By Clarence A. O'Brien
Hyman Berman
Attorneys Patented Jan. 5, 1937

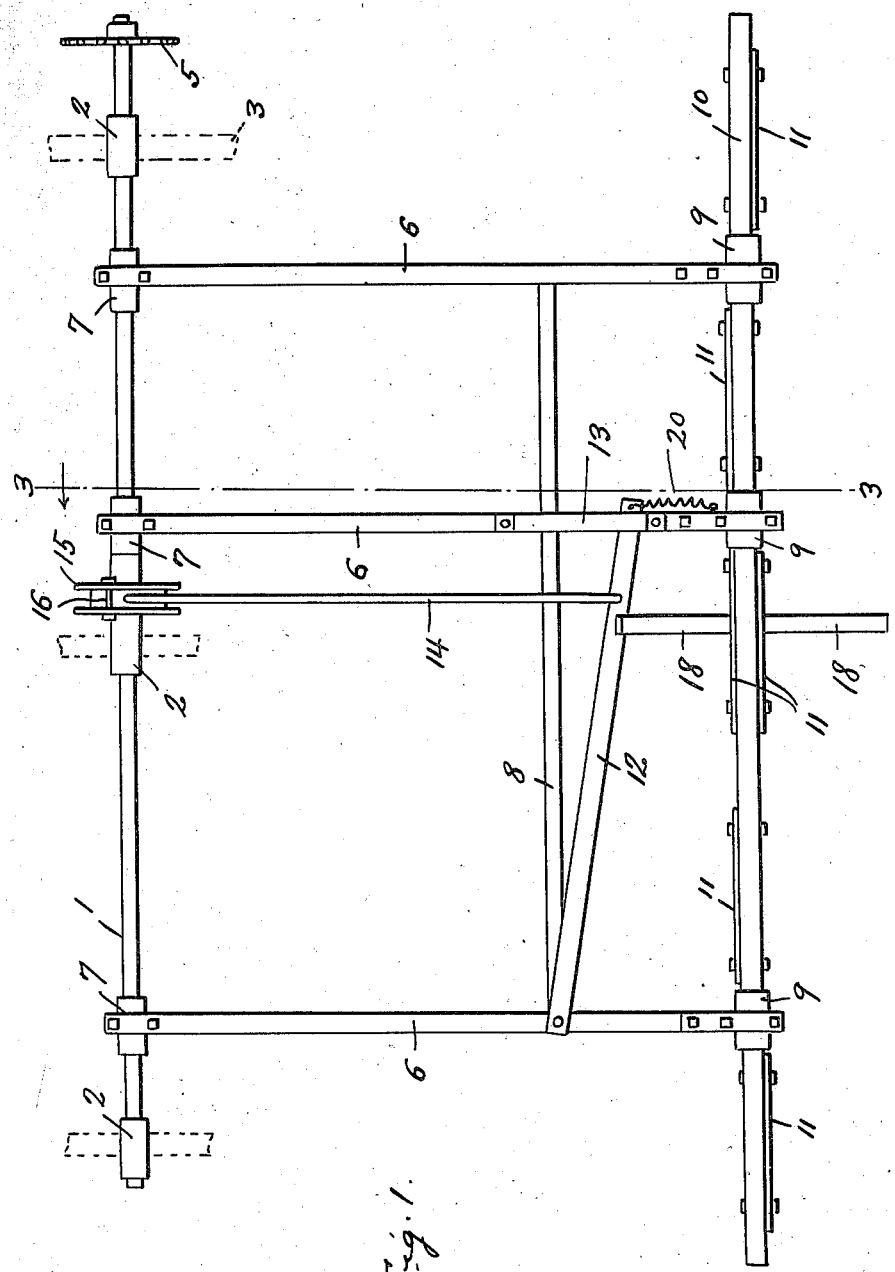

2,066,812

UNITED STATES PATENT OFFICE 2,066,812

AGRICULTURAL IMPLEMENT

Jesse I. Wilcoxen, Sr., and Jesse I. Wilcoxen, Jr., Ford, Kans.

Application July 9, 1936, Serial No. 89,822

1 Claim. (Cl. 97—55)

The present invention relates to new and useful improvements in agricultural implements and has for its primary object to provide, in a manner as hereinafter set forth, an apparatus embodying novel means for forming dams at spaced points in the furrows or ditches made by a lister or other device, thereby controlling the run off of water and conserving the soil.

Other objects of the invention are to provide an implement of the aforementioned character which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a top plan view of the invention.

Figure 2 is a view in rear elevation of the rear portion of the device.

Figure 3 is a view in vertical longitudinal section, taken substantially on the line 3—3 of Figure 1.

Referring now to the drawings in detail, it will be seen that the embodiment of the invention which has been illustrated comprises a transverse front shaft 1 which is journaled in suitable spaced bearings 2 which bearings are mounted on the lister or similar implement. This is shown to advantage in Figure 3 of the drawings, a portion of a lister being shown in dotted lines and designated generally by the reference numeral 3. The bearings 2 are mounted on the upper ends of suitable standards 4. The shaft 1 is driven from the lister 3 by a chain and sprocket connection 5.

The reference numeral 6 designates longitudinal bars having bearing 7 on their forward end portions journaled on the shaft 1. It will thus be seen that the bars 6 are mounted for swinging movement in a vertical plane. A suitable brace 8 extends between the bars 6 at an intermediate point. Journaled in bearings 9 on the rear end portions of the bars 6 is a shaft 10 having fixed thereto oppositely extending spades 11, said spades being substantially triangular.

Pivotally mounted on one of the bars 6 is a stop bar 12 the free end portion of which travels in a guide 13 which is mounted on another of said bars 6. Connected to the free end portion of the stop bar 12 is a forwardly extending rod 14. The free forward end portion of the rod 14 rides in a grooved wheel 15 which is fixed on the shaft 1 and which has mounted therein transverse pins 16 which are engageable with a hook 17 on the forward end of the rod 14. The stop bar 12 is adapted to be disposed in the path of arms 18 which project in opposite directions from the shaft 10 for arresting said shaft upon the completion of each half of a revolution with the spades 11 in a vertical or operative position.

It is thought that the operation of the implement will be readily apparent from a consideration of the foregoing. The spades 11 are adapted to engage and travel in the furrows or ditches left by the shovels 19 of the lister or cultivator 3. As the shaft 1 rotates, being driven from the lister or cultivator, the pins 16 on the grooved wheel 15 engage the hook 17 and pull the stop bar 12 forwardly out of the path of the arm 18 which is engaged therewith, thus permitting the shaft 10 to rotate one-half of a revolution for releasing the dirt which has accumulated in front of the lowermost spades 11, this released dirt forming dams in the furrows or ditches. As the pins 16 drag the rod 14 forwardly said rod is carried downwardly until it engages the bottom of the groove in the wheel 15 for disengaging the hook 17 in a manner which is thought to be obvious. When this occurs a spring 20 immediately returns the stop bar 12 to the position shown to advantage in Figure 1 of the drawings for engagement by the next arm 18 for positively arresting the shaft 10 with the other set of spades 11 in lowered or operative position in the furrows or ditches.

It is believed that the many advantages of an agricultural implement constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:—

An agricultural implement of the class described comprising a shaft, means for actuating said shaft, bars journaled on the shaft for swinging movement, a second shaft journaled on said bars, substantially triangular ground engaging spades mounted on the second-named shaft and projecting in opposite directions therefrom, arms projecting from the second named shaft, a stop bar pivoted at one end and engageable by the arms for periodically arresting and releasing the second-named shaft with certain of the spades in operative position and certain of said spades in inoperative position a guide for the other end of the stop bar, and means for operatively connecting the stop bar to the first-named shaft for periodical actuation thereby, the last-named means including a grooved wheel fixed on the first-named shaft, pins traversing the grooved wheel, a rod pivotally connected to the stop bar, and a hook on one end of said rod engageable by the pins for actuation thereby.

JESSE I. WILCOXEN, Sr.
JESSE I. WILCOXEN, Jr.